(12) United States Patent
Mueller

(10) Patent No.: US 8,688,596 B2
(45) Date of Patent: Apr. 1, 2014

(54) PROJECT ACTIVITY REPORTING

(75) Inventor: Roland Mueller, Neustadt (DE)

(73) Assignee: SAP AG, Walldorf (DE)

( * ) Notice: Subject to any disclaimer, the term of this patent is extended or adjusted under 35 U.S.C. 154(b) by 1578 days.

(21) Appl. No.: 10/161,062

(22) Filed: May 30, 2002

(65) Prior Publication Data

US 2003/0225587 A1 Dec. 4, 2003

(51) Int. Cl.
*G06Q 10/00* (2012.01)
*G06Q 10/10* (2012.01)

(52) U.S. Cl.
CPC .................................. *G06Q 10/105* (2013.01)
USPC ............................ 705/321; 705/1.1; 705/320

(58) Field of Classification Search
USPC ....................................... 705/1, 1.1, 320, 321
See application file for complete search history.

(56) References Cited

U.S. PATENT DOCUMENTS

| | | | |
|---|---|---|---|
| 5,907,490 A * | 5/1999 | Oliver | 700/90 |
| 6,282,514 B1 * | 8/2001 | Kumashiro | 705/7 |
| 6,678,671 B1 * | 1/2004 | Petrovic et al. | 707/1 |
| 2001/0042032 A1 * | 11/2001 | Crawshaw et al. | 705/32 |
| 2002/0065697 A1 * | 5/2002 | Cautley et al. | 705/7 |
| 2002/0082895 A1 * | 6/2002 | Budka et al. | 705/9 |
| 2002/0120493 A1 * | 8/2002 | Mormile | 705/11 |
| 2002/0128895 A1 * | 9/2002 | Broderick et al. | 705/9 |
| 2002/0198755 A1 * | 12/2002 | Birkner et al. | 705/8 |
| 2003/0050812 A1 * | 3/2003 | Clark et al. | 705/7 |
| 2003/0050871 A1 * | 3/2003 | Broughton | 705/28 |
| 2003/0208397 A1 * | 11/2003 | VanDusen | 705/14 |
| 2003/0229618 A1 * | 12/2003 | Judy | 707/1 |

* cited by examiner

*Primary Examiner* — Jonathan Ouellette
(74) *Attorney, Agent, or Firm* — Finnegan, Henderson, Farabow, Garrett & Dunner, LLP

(57) ABSTRACT

A project management and activity recording system defines project tasks, project positions, and assigns personnel to the project positions. As the assigned personnel perform project tasks from a remote location, they may periodically record their activities in the project software. The recorded activity information is used to update the project to keep records such as time, cost, expenses, and task completion current, even when offsite personnel or contractors are used. A reporting user interface may be selected based on the reporting device, and data entry may be performed by updating historical or default values.

20 Claims, 3 Drawing Sheets

PROJECT ACTIVITY REPORTING

TECHNICAL FIELD

This invention relates to project management systems and methods, and more particularly to a software-based system and method for activity reporting and project management.

BACKGROUND

Good project management is an important factor to the success of a project. A project may be thought of as a collection of activities and tasks designed to achieve a specific goal of the organization, with specific performance or quality requirements while meeting any subject time and cost constraints. Project management refers to managing the activities that lead to the successful completion of a project. Project management focuses on finite deadlines and objectives. A number of tools may be used to assist with project management and assessment.

Project management may be used when planning of personnel resources and check capacities is desired. The project may be linked to the objects in a professional services life cycle and may accompany the objects from the opportunity over quotation, contract, time and expense (T&E) recording, billing, period-end-activities until the final reporting. Naturally the project gets even more detailed when moving through this cycle.

A project may arise as an opportunity or a request for quotation (inquiry) sent by a potential customer. When the opportunity or request arrives, a decision has to take place by the manager whether the opportunity should be pursued or a quotation be submitted. Even at this early stage, it is important to check whether the company has the necessary capacity and resources with the required skills and qualifications available at the requested time.

For any given project, several project tasks should be defined. Project tasks describe the activities and phases that have to be performed in the project such as writing of blueprints, customizing, testing etc. and can be arranged hierarchically.

For a project to be successful, the person that carries out the project task needs to be able to interface with the project software to provide updates on their activities. For external staffing, project reporting should use the same procedure and interface as internal staffing.

What is needed is a system that allows personnel to be able to record their activities (times and expenses) to allow for the reimbursement of travel expenses, controlling of costs both of sales and service execution and to support workforce planning (e. g. absence, attendance).

SUMMARY

A project management and activity recording system defines project tasks, project positions, and assigns personnel to the project positions. As the assigned personnel perform project tasks from a remote location, they may periodically record their activities in the project software. The recorded activity information is used to update the project to keep records such as time, cost, expenses, and task completion current, even when offsite personnel or contractors are used. A reporting user interface may be selected based on the reporting device, and data entry may be performed by updating historical or default values.

DESCRIPTION OF DRAWINGS

These and other features and advantages of the invention will become more apparent upon reading the following detailed description and upon reference to the accompanying drawings.

DETAILED DESCRIPTION

Figure 1:
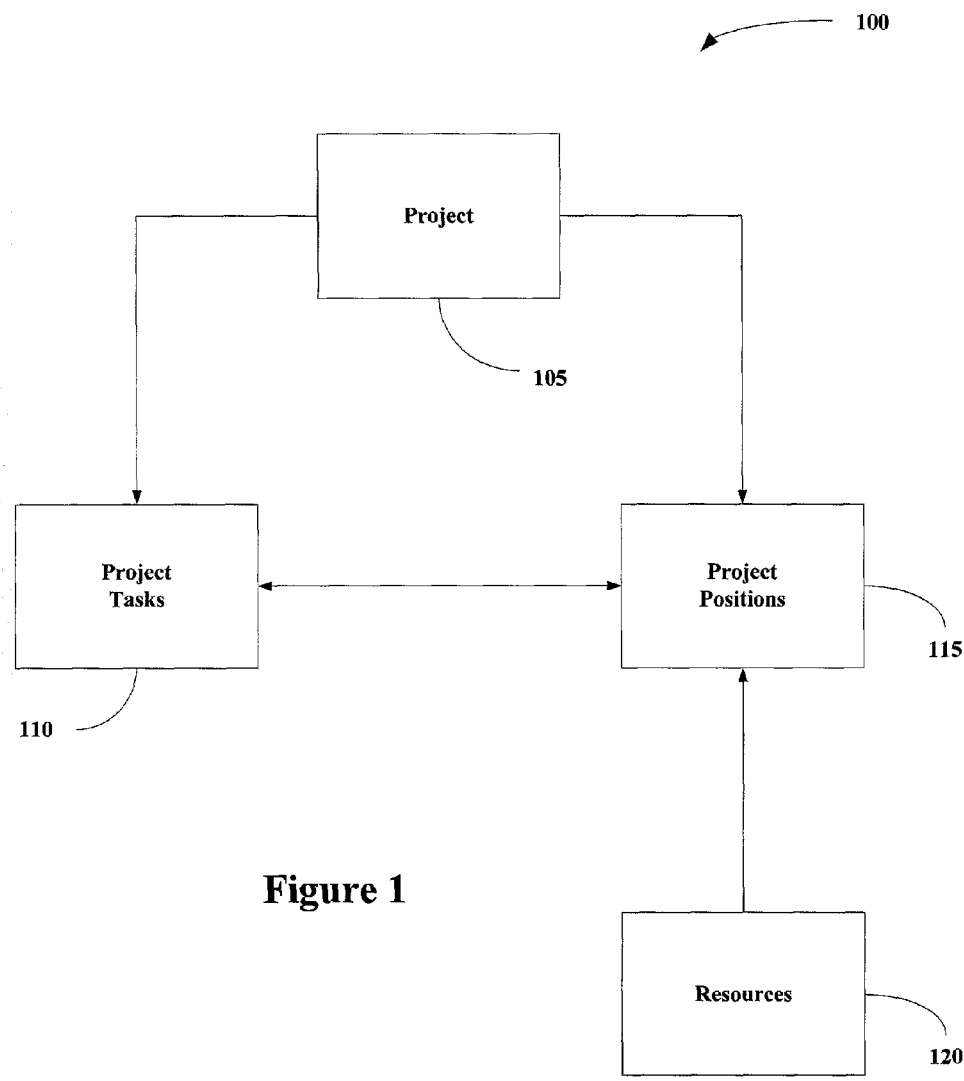
FIG. 1 illustrates the overall structure of a project management system.

FIG. 1 illustrates the overall structure of project management system 100 showing the relationship between a project 105, project tasks 110, project positions 115, and resources 120. The project 100 is a strategy to achieve a defined goal of an organization. The project 100 may be divided into a series of project tasks 110 and/or a series of project positions 115.

The project tasks 110 define activities and phases to be performed in the project 105. For example, for a construction project examples of project tasks 110 may include preparing blue prints, obtaining the proper permits, preparing the foundation, ordering the lumber, hiring sub-contractors, etc. The project tasks 110 describe operational activities or phases in the project 105 that should be performed like analysis, business blueprint, implementation, and documentation. The project tasks 110 describe qualification requirements and time demand: To be able, e.g., to write a business blueprint document it is necessary to have attended a specific training session and to be available in the first weeks of September. Project tasks 110 have a hierarchical structure, i.e. tasks can be grouped or split up. Sometimes the refinement and split of tasks into several sub-tasks occurs at a later time in the life cycle of the project 110.

The project positions 115 define project roles by job title. For the same construction example, project positions 115 may include architect, foreman, electrician, mason, supervisor, etc. The project positions 115 may include qualifications and requirements for each project position 115. Thus, a project position 115 may require availability (such as during the month of July) and certain certifications (such as certification for high voltage installations, professional licenses). The project positions 115 represent roles in the project 105 and describe what roles with what requirements exist in the project 105. The project positions 115 may be described by fields like position type, category, time demand, description, qualification requirements, etc. One example for such a position is the project manager. The qualification requirements for this position might be: account expert, at least two similar projects done, available from September until November for at least 80% of the time. Project positions 115 are non-hierarchical and can be represented by a linear list assigned to a project header. It might be necessary to change the project positions 115 continually during the life cycle of the project 105.

The resources 120 describe a particular person or group that may fill a project position. For a company project 105, the resources 120 may be all the employees of the company. The resources 120 are listed by name and may also include job title, availability, qualifications or other information. The resources 120 may also include any other personnel the company may use, including contractors and temporary workers.

Figure 2:
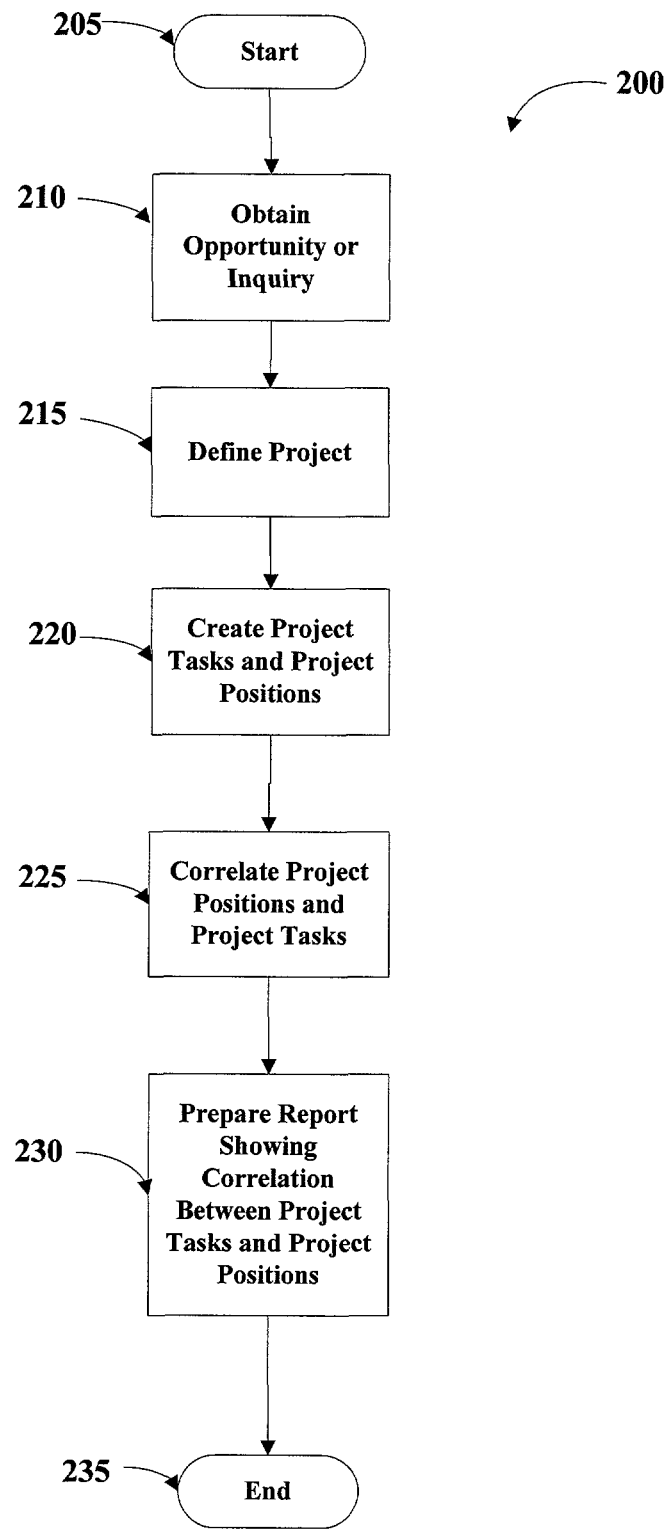
FIG. 2 illustrates a process for generating a project in a project management system.

FIG. 2 illustrates a process 200 for generating a project in a project management system. The process 200 begins at a START block 205. Proceeding to block 210, an opportunity of inquiry is obtained. An opportunity or inquiry asks for a simple or complex engagement, where one or more persons are required to perform dedicated tasks. This engagement is requested to be performed in a defined time frame.

Proceeding to block 215, the process 200 defines a project 105 based on the opportunity or inquiry. The project 105 may be defined to check whether it is possible and reasonable to make an offer (quotation).

Proceeding to block 220, the requirements and tasks of the project 105 may be structured as project tasks 110 and the positions (roles) have to be estimated and structured as project positions 115. As described above, the project tasks 110 define activities and phases to be performed in the project 105 and the project positions 115 define project roles by job title.

Proceeding to block 225, the project positions 115 and the project tasks 110 are correlated. Within the project 105 a correlation between project positions 115 and project tasks 110 is performed by the project manager or a resource manager. The correlation describes what project position (role) 115 is responsible to work on a project task 110. It is possible to correlate one project position 115 to several project tasks 110. During the correlation of a project position 115 to a project task 110, the project position 115 acts as a supplier or (nominal) resource that fulfills the time demand and qualification requirements of the project task 110. Thus a matching of time and qualification data between project positions 115 and project tasks 110 should be possible.

Proceeding to block 230, an optional report may be prepared. An integrated reporting functionality is available within the project 105. The reporting functionality may show all project tasks 110 for a project position 115 or all project positions 115 that are assigned to a project task 110.

The process 200 can be accomplished by a consulting manager or by a (potential) project manager using software on a computer. The project 105 does not have to be highly complex or lengthy. For example, in a case of a so-called spot-consulting scenario (example: a consultant is needed for two days to define a report) the consulting project consists only of one position and the single task is represented by the consulting project itself.

The planning of structures, costs, revenues, resources, timelines, etc. can and will normally be refined and detailed during the life cycle of the project 105. For example, in the opportunity phase it might be enough to plan a project 105 in a very rough way to estimate costs and timelines. If a quotation is sent to the (potential) customer and is accepted and a contract is signed, the same project 105 can be used as an operative project. In this case, more details, more exact times, costs, revenues, personnel resources etc. may be added. During the execution of the project 105, these values could be updated permanently.

Figures 3, 4:
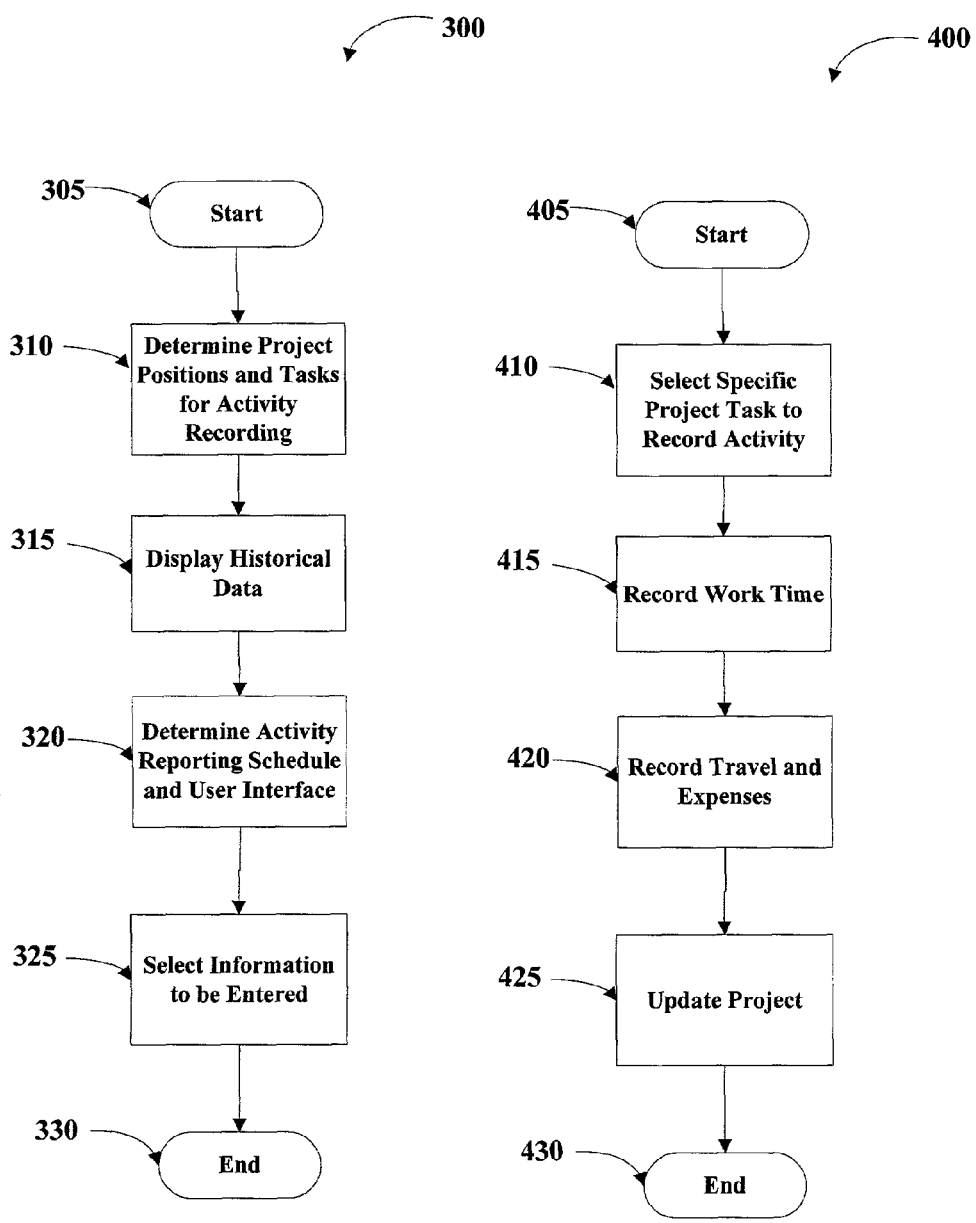
FIG. 3 illustrates a process for establishing project positions and tasks for activity reporting in a project management system.
FIG. 4 illustrates a process for reporting activity in a project management system.

FIG. 3 illustrates a process 300 for establishing project positions and tasks for activity reporting in a project management system. The process 300 begins at a START block 305. Proceeding to block 310, the project manager determines which project positions 115 and project tasks 110 to select for activity reporting. The project positions 115 and project tasks 110 selected for activity reporting may depend on the object creating the project 105. For example, a project position 115 staffed by a consultant or group of consultants may be selected. The selection or grouping may also be made depending on the skills or experience of the consultant.

Proceeding to block 315, the process 300 may optionally display historical data as desired to assist in completion of the project task 110. Historical data may be used to show, for example, a summary of activity reporting by project task 110 or project tasks 110 in the same location area. This will allow a consultant to obtain information such as how many consulting hours already spent, or amount of days of training already taken or given for any given project task 110. The historical summary for any project tasks 110 may be accessed by simply clicking on the corresponding line items.

Proceeding to block 320, the process 300 determines a schedule for the activity reporting and appropriate user interfaces. The business of a consultant is characterized by its variety and complexity. Therefore, the activity reporting should be flexible to match these requirements. The activity reporting could be done in a variety of manners such as:

on a periodic base : at the end of the week, at the end of the month, a certain day in the month, etc.; or on an initial base: in the evening in a hotel, at the airport waiting for a plane Depending on the medium the user interface to be used for the activity reporting functionality may be adjusted. The user interface selected may be determined by the location of the consultant and the access to the project database. The user interface may be online, offline (PDA, WAP phone, laptops, etc.), web based, or other. Specially for smaller devices like PDA's or a WAP phone, it is important to have a limited view on the data. The user interface should distinguish between the activity reporting tool used and format and prepare the information accordingly. Both online and offline activity reporting should be as simple and intuitive as possible.

Proceeding to block 325, the information to be entered during the activity reporting is selected. The following information are examples of the types of information that may be entered, or updated from default or historical values:

Type of activity: consulting, workshop, preparation, training, absence, attendance, vacation Level of activity: activity rate which is important for billing purpose.

Role: Role of consultant in the engagement (manager, sponsor, project leader, team member . . . ).

Task: the task the consultant is assigned to in an engagement (blueprint, configuration, prototyping . . . ).

Location: address of the engagement (City, street . . . ).

Text: explaining the activity recording in more detail, should be optional carried over into the billing document.

Time: Hours, ½ day, day, week, month; if planned engagement available values should default in for the recording period/time. After the type of information to be entered is selected, the process 300 terminates in an END block 330.

FIG. 4 illustrates a process 400 for reporting activity in a project management system. The process 400 begins in START block 405. Proceeding to block 410, the process 400 selects a specific project task 110 or project position 115 to record ongoing activity for the task or position. To record the ongoing activity, the consultant clicks on the relevant item he wants to record activities for. The engagement could be a short term one (one day, one week) or could be for a longer period of time.

Proceeding to block 415, the work time is recorded for the task. In recording the work time, the consultant may take over the default value of the dates proposed or enter the actual time worked on the specific day. The consultant may work with the entry directly in the work list item without creating a separate line item. The time entry should be flexible enough to enter hours, half days, days or weeks or to confirm the whole time of the assignment in one step. Rest validations may be calculated once the entry is done and shown in a separate line. A plausibility check based on a company calendar and human resource restrictions may be performed to avoid conflicts such as working only 8 hours per day, not working on holidays or weekends, etc. These restrictions may be based on a special profile assigned to the consultant. If allowed, additional time such as overtime, travel hours, etc. should be entered. This extra time may be handled as an exception in the normal time calculation process for the day. Using this time reporting, it should be possible for the consultant to be involved in more than one engagement or assignment the same day. For example, in the morning the consultant may be working on project task A and in the afternoon on project task B, or working on a project during the day but in the evening traveling to an other engagement.

Proceeding to block 420, the process 400 may record travel and expense entries for an off-site consultant. Travel and expenses may occur when the consultant is onsite at the customer. The travel and expense entry may be linked to a project task. The process 400 allows for more than one travel and expense entry per date because it is possible for a consultant to work on more than one project tasks per day. Thus, the process 400 may allow travel and expenses to be entered for a day, a shorter period of time or for an entire project task. Different cost types (taxi, hotel, tickets, parking, etc.), currency conversion and the like may be available.

Proceeding to block 425, the process 425 updates the project 105 with the activity reports from the consultants. By updating the main project database, a project manager is able to monitor ongoing costs and expenses even when consultants and employees are working on the project off-site. After the project database is updated, the process 400 terminates in END block 430.

Numerous variations and modifications of the invention will become readily apparent to those skilled in the art. Accordingly, the invention may be embodied in other specific forms without departing from its spirit or essential characteristics.

What is claimed is:

1. A computer-implemented method for a user to report an activity in a project, the method comprising the following operations performed by at least one processor:
   receiving from the user a selection of a project position and a project task, the selection of the project position including a selection from a first predetermined list of a job position of a person performing the project and a separate selection from a second predetermined list of a qualification or a requirement for the job position of the project, the qualification or requirement including a predetermined technical expertise;
   retrieving, from a database, stored data based on the project position and the project task selected by the user;
   providing a user interface based on the type of access to the database by a reporting device of the user, the user interface being one of an online, offline, and web based interface;
   providing instructions to display the stored data to the user on the reporting device using the user interface;
   enabling the user to select a type of information to be reported;
   receiving, from the user, activity information related to the selected type of information; and
   updating the stored data in the database based on the received activity information.

2. The method of claim 1, wherein the type of information comprises at least one of type of activity, level of activity, role, task, location, explanation, time, and cost.

3. The method of claim 1, wherein the stored data comprises at least one of default data and historical data.

4. The method of claim 3, wherein receiving activity information comprises modifying, by the user, at least one of the default data or the historical data.

5. The method of claim 1, wherein the user enters the activity information from a location remote from the database.

6. The method of claim 1, further comprising setting a schedule for receiving activity information.

7. The method of claim 6, wherein the schedule is periodic.

8. A non-transitory computer readable medium having a computer program executed by at least one processor to perform a method for a user to report an activity in a project, the method comprising:
   receiving from the user a selection of a project position and a project task, the selection of the project position including a selection from a first predetermined list of a job position of a person performing the project and a separate selection from a second predetermined list of a qualification or a requirement for the job position of the project, the qualification or requirement including a predetermined technical expertise;
   retrieving, from a database, stored data based on the project position and the project task selected by the user;
   providing a user interface based on the type of access to the database by a reporting device of the user, the user interface being one of an online, offline, and web based interface;
   displaying the stored data to the user on the reporting device using the user interface;
   enabling the user to select a type of information to be reported;
   receiving, from the user, activity information related to the selected type of information; and
   updating the stored data in the database based on the received activity information.

9. The computer-readable medium of claim 8, wherein the type of information comprises at least one of type of activity, level of activity, role, task, location, explanation, time, and cost.

10. The computer-readable medium of claim 8, wherein the stored data comprises at least one of default data and historical data.

11. The computer-readable medium of claim 10, wherein receiving activity information comprises modifying, by the user, at least one of the default data or the historical data.

12. The computer-readable medium of claim 8, wherein the user enters the activity information from a location remote from the database.

13. The computer readable medium of claim 8, wherein the method further comprises setting a schedule for receiving activity information.

14. The computer-readable medium of claim 13, wherein the schedule is periodic.

15. A computer-implemented method for reporting an activity in a project, the method comprising the following operations performed by at least one processor:
   retrieving, from a database, stored data based on a project position and a project task selected by a user at the same time, the selection of the project position including a selection from a first predetermined list of a job position of a person performing the project and a separate selection from a second predetermined list of a qualification or a requirement for the job position of the project, the qualification or requirement including a predetermined technical expertise;

providing instructions to display the stored data to the user;

enabling the user to select a type of information to be reported;

receiving, from the user, activity information related to the selected type of information; and validating the activity information received from the user by a plausibility check.

16. The method of claim 15, further comprising:

updating the stored data in the database based on the activity information validated by the plausibility check.

17. The method of claim 15, wherein the plausibility check is based on at least one of a calendar, restrictions, and profiles assigned to the project position or the project task.

18. A non-transitory computer readable medium having a computer program executed by at least one processor to perform a method for reporting an activity in a project, the method comprising:

retrieving, from a database, stored data based on a project position and a project task selected by a user at the same time, the selection of the project position including a selection from a first predetermined list of a job position of a person performing the project and a separate selection from a second predetermined list of a qualification or a requirement for the job position of the project, the qualification or requirement including a predetermined technical expertise;

displaying the stored data to the user;

enabling the user to select a type of information to be reported;

receiving, from the user, activity information related to the selected type of information; and validating the activity information received from the user by a plausibility check.

19. The computer readable medium of claim 18, wherein the method further comprises:

updating the stored data in the database based on the activity information validated by the plausibility check.

20. The computer readable medium of claim 18, wherein the plausibility check is based on at least one of a calendar, restrictions, and profiles assigned to the project position or the project task.

* * * * *